(12) United States Patent
Michelitsch

(10) Patent No.: US 8,509,340 B2
(45) Date of Patent: Aug. 13, 2013

(54) SIGNAL TRANSMISSION SYSTEM

(75) Inventor: Michael Michelitsch, Graz (AT)

(73) Assignee: NXP B.V., Eindhoven (NL)

( * ) Notice: Subject to any disclaimer, the term of this patent is extended or adjusted under 35 U.S.C. 154(b) by 1079 days.

(21) Appl. No.: 12/515,783

(22) PCT Filed: Nov. 23, 2007

(86) PCT No.: PCT/IB2007/054760
§ 371 (c)(1),
(2), (4) Date: Jun. 4, 2009

(87) PCT Pub. No.: WO2008/062380
PCT Pub. Date: May 29, 2008

(65) Prior Publication Data
US 2010/0246707 A1   Sep. 30, 2010

(30) Foreign Application Priority Data
Nov. 24, 2006 (EP) .................................. 06077176

(51) Int. Cl.
*H04B 15/00* (2006.01)
(52) U.S. Cl.
USPC ................ 375/285; 340/12.51; 340/13.26; 375/296; 398/193; 455/114.3

(58) Field of Classification Search
None
See application file for complete search history.

(56) References Cited

U.S. PATENT DOCUMENTS

| | | | | |
|---|---|---|---|---|
| 5,249,200 A | * | 9/1993 | Chen et al. | 375/285 |
| 7,697,600 B2 | * | 4/2010 | Maangat et al. | 375/229 |
| 8,023,457 B2 | * | 9/2011 | Kotecha et al. | 370/329 |
| 2006/0049890 A1 | | 3/2006 | Wasaki et al. | |
| 2006/0115030 A1 | * | 6/2006 | Erving et al. | 375/348 |
| 2006/0125571 A1 | | 6/2006 | Hamada et al. | |

FOREIGN PATENT DOCUMENTS

| | | |
|---|---|---|
| WO | 9963675 A1 | 12/1999 |
| WO | 2005/008911 A | 1/2005 |
| WO | 2005/011139 | 3/2005 |
| WO | 2005/101771 A | 10/2005 |

* cited by examiner

*Primary Examiner* — Adolf Dsouza

(57) ABSTRACT

A system is operated to transmit signals from a transmitter to a receiver. The transmitter is muted. A receiver transfer function for the receiver is adjusted so that an output signal of the receiver is minimized. A transmitter transfer function of the transmitter is set to be inverse to the adjusted receiver transfer function.

10 Claims, 1 Drawing Sheet

SIGNAL TRANSMISSION SYSTEM

FIELD OF THE INVENTION

The invention relates to a method of operating a system for transmitting signals from a transmitter to a receiver.

Moreover, the invention relates to a computer-readable medium.

Furthermore, the invention relates to a program element.

Furthermore, the invention relates to a transmitter.

Furthermore, the invention relates to a receiver.

Finally, the invention relates to a signal transmission system.

BACKGROUND OF THE INVENTION

Data transmission is important in many technical fields, including RFID ("radio frequency identification") systems. In a data transmission system involving multiple transmission channels, over which signals are sent, problems with common mode interferences can occur. This term describes a signal disturbing phenomenon that can appear when a plurality of signal leads are influenced by a interference signal in the same manner.

WO 2005/011139 discloses an electronic circuit to reduce noise in a digital subscriber loop. In order to reduce noise in telecommunications made over an unshielded twisted pair of metallic conductors, an active electronic circuit for a two-to-four wire hybrid circuit reduces common mode signals without recourse to inductive components. The hybrid has a balance network that dynamically alters its impedance to closely balance with the two wire line impedance. Residual common mode signals are cancelled. Resistors are connected to the wires and the circuit generates a high impedance to differential mode signals and a virtual ground to common mode signals.

However, conventional data transmission systems suffer from insufficient signal quality due to the influence of interference signals.

OBJECT AND SUMMARY OF THE INVENTION

It is an object of the invention to enable signal transmission with sufficient quality.

In order to achieve the object defined above, a method of operating a system for transmitting signals from a transmitter to a receiver in an environment in which an interference signal may be present is provided, the method comprising the steps of muting the transmitter, adjusting a receiver transfer function of the receiver so that an output signal of the receiver is minimized, and setting a transmitter transfer function of the transmitter to be inverse to the adjusted receiver transfer function.

In order to achieve the object of the invention, furthermore a computer-readable medium (e.g. a CD, a DVD, a USB stick, a floppy disk or a hard disk) is provided, in which a computer program for transmitting signals from a transmitter to a receiver in an environment in which an interference signal may be present is stored which, when being executed by a processor, is adapted to control or carry out a method having the above mentioned features.

In order to achieve the object of the invention, furthermore a program element for transmitting signals from a transmitter to a receiver in an environment in which an interference signal may be present is provided, which program element, when being executed by a processor, is adapted to control or carry out a method having the above mentioned features.

In order to achieve the object of the invention, furthermore a transmitter for a system for transmitting signals from the transmitter to a receiver in an environment in which an interference signal may be present is provided, the transmitter comprising a muting unit adapted for muting the transmitter, and a setting unit adapted for setting a transmitter transfer function of the transmitter to be inverse to a receiver transfer function.

In order to achieve the object of the invention, furthermore a receiver for a system for transmitting signals from a transmitter to the receiver in an environment in which an interference signal may be present is provided, the receiver comprising an adjustment unit for adjusting a receiver transfer function of the receiver in a mute state of the transmitter so that an output signal of the receiver is minimized, and a transfer unit for transferring the adjusted receiver transfer function to the transmitter to enable the transmitter to set a transmitter transfer function of the transmitter to be inverse to the adjusted receiver transfer function.

In order to achieve the object of the invention, finally a signal transmission system is provided, comprising an inventive transmitter for transmitting signals to an inventive receiver.

According to the invention, a system for calibrating a communication arrangement is provided, in which interference signals (or disturbing signals) are efficiently suppressed. In accordance with such a system, a sender is brought into a silent non-transmitting state. In this state, a transfer function of a receiver is adjusted in a manner to reduce an output signal of the receiver originating from interference signals in the environment as much as possible. Subsequently, the transmitter is adjusted in such a way that its transfer function is essentially inverse to the transfer function of the receiver. By doing so, common mode interferences are suppressed and a data transmission with an improved common mode rejection is obtained. Such a system allows for efficient suppression of an influence of interference signals on the signal transmission line even when multiple transmission paths are used (for instance in a differential data transmission system). This also holds for a scenario in which the interference signals couple into the different transmission paths in an unequal or different manner. It should be noted that the transmission channel can be wire based (for instance via a cable, for example in a similar manner as in a USB communication), or based on wireless communication according to a corresponding wireless data transmission protocol (for instance using a 13.56 MHz frequency of an RFID system, using a Bluetooth system, using infrared communication, etc.). Furthermore, it should be noted that signal processing and data communication calibration for suppressing interference signals and for improving the signal quality which is performed according to embodiments of the invention can be realized by a computer program, that is by software, or by using one or more special electronic optimization circuits, that is in hardware, or in hybrid form, that is by means of software components and hardware components.

The term "transfer function" particularly denotes a (mathematical filter) function describing a ratio between an output signal and an input signal of a signal manipulating unit, particularly in a time invariant system. The transfer function describes an impact of a signal manipulating unit on a signal to be processed by this signal manipulating unit.

The term "inverting a transfer function" particularly denotes modifying the transfer function in a manner that the effect of the original transfer function is compensated by the inverted transfer function. In the case of a scalar transfer function, inverting is equal to a multiplication with a factor of −1.

The term "interference signal" particularly denotes any signal which influences a useful signal, which is transmitted over a transmission channel, in an undesired or unintended manner.

Further exemplary embodiments of the inventive method will be explained hereinafter, which embodiments also apply to the computer-readable medium, to the program element, to the transmitter, to the receiver, and to the signal transmission system.

It is advantageous if the method comprises the step of transmitting the signals from the transmitter to the receiver after having adjusted the receiver transfer function and after having set the transmitter transfer function. In other words, first, a calibration phase is performed, in which the receiver transfer function and the transmitter transfer functions are adjusted for an efficient suppression of an influence of interfering signals on the data transmission line. Subsequently, data communication is performed with proper data transmission quality.

It is furthermore advantageous if the method comprises the step of transmitting the signals via a multi channel (particularly multi-wire) communication from the transmitter to the receiver. For example, the signals are transmitted via two or more wires, for instance in a differential manner. In such a scenario it may happen that a interference signal couples into the different communication paths in a different manner. The interference signal suppression scheme according to an exemplary embodiment of the invention allows for a proper transmission quality even under such harsh circumstances.

Advantageously, the method comprises the step of adjusting the receiver transfer function by adjusting a gain and/or a phase parameter of the receiver characteristic. The gain and the phase are two proper (filter) parameters which can be modified so as to suppress the influence of interference signals appropriately.

Advantageously, the method also comprises the step of adjusting the receiver transfer function by adjusting a plurality of stages of the receiver. For example, the receiver has two input stages, and the transmitter has two output stages. Then, the transfer functions being indicative of the performance of the individual stages are adjusted individually, thereby improving accuracy of the adjustment. First, the sender is muted and then the receiver transfer functions is determined by adjusting the input stages of the receiver (e.g. in gain and phase) so that the output signal is a minimum. Finally, the sender transfer functions is set to the inverse receiver transfer functions, and the data transmission is started. By taking this measure, a compensation of different interference signals on a transmission line is possible, thereby particularly enabling improved data transmission via two or more wires.

Advantageously, the method also comprises the step of setting the transmitter transfer function by adjusting a plurality of stages of the transmitter to be inverse to a respective one of the plurality of stages of the receiver. Therefore, each state of the transmitter has an associated stage of the receiver, or vice versa. By taking the measure to implement a plurality of stages in the transmitter and in the receiver, a fine tuning of the transmission properties can be carried out.

Advantageously, the method also comprises the step of adjusting the receiver transfer function in a frequency dependent manner. By performing such a frequency dependent subtraction, a transfer function of a disturbing channel may be emulated, and interference signals may be compensated, in a sophisticated manner. In other words, the subtraction of signals in a differential data transmission scheme may be performed frequency-dependent. In this context, the frequency denotes a frequency of data signals to be transmitted.

Further exemplary embodiments of the inventive signal transmission system will be explained hereinafter, which embodiments also apply to the method, to the computer-readable medium, to the program element, to the receiver, and to the transmitter.

It is advantageous if the signal transmission system comprises a signal transmission channel for transmitting the signals from the transmitter to the receiver and comprises a (separate) transfer function transfer channel for transferring the adjusted receiver transfer function from the receiver to the transmitter. The signal transmission channel is the channel over which data or signals are transmitted. The transfer function transfer channel is a communication channel over which the receiver sends adjusted transfer function parameters to the transmitter as a basis for the inverse transfer function adjustment there, for instance via a feedback loop. Then, the transmitter adjusts its transfer function so that it is inverse to the one of the receiver.

Furthermore it is advantageous if the transmitter and the receiver is located within one and the same apparatus, for instance a transceiver. An example for such an embodiment is an RFID reader, in which the originally emitted radio frequency signal and the radio frequency signal modulated or damped by a present RFID tag forms the signal to be transmitted. In such a scenario, a wired or wireless data communication line between the receiver and the transmitter in the apparatus transmits the adjusted transfer function parameters from the receiver to the transmitter.

According to another embodiment, the transmitter and the emitter are components of two different devices. In such a scenario, a separate data communication channel for transmitting the transfer functions from the transmitter to the receiver may be advantageous or necessary. Such a system may include a periphery device connected to a computer via some kind of USB connection. When signals shall be transmitted from the periphery device to the computer, or vice versa, one of the communication partners serves as the transmitter and the other one as the receiver.

Examples for the signal transmission system are an RFID reader, a contactless chip card reader, a USB data transmission system, or a telephone signal transmission system. In case of a reader for transponders, the signal transmission system may be formed as a part of the base station reading a (for instance mobile/wireless) transponder. Such a reader may be a base station cooperating with a radio frequency identification tag (RFID tag) or with a (for instance contactless) smart card.

An RFID tag usually comprises a semiconductor chip (having an integrated circuit) in which data is stored, and a high frequency antenna matched to an operation frequency band used (for example 13.56 MHz). Besides the RFID tag, an RFID system comprises a read/write device (i.e. a base station—simply, also referred to as "reader") and a system antenna enabling a bi-directional wireless data communication between the RFID tag and the read/write device (e.g. a loop antenna, a monopole antenna, or a dipole antenna). Additionally, an input/output device (for instance a computer) is used to control the read/write device. Different types of RFID systems are known, namely battery-assisted (powered by a battery, wherein a back modulation usually is done by using load modulation (RF) or back scatter (microwaves)), active RFID systems (powered by a battery, wherein a back modulation is performed actively) and passive RFID systems (powered via the RF field emitted by a reader, wherein a back modulation is done by using load modulation (RF) or back scatter (microwaves)). Moreover, semi-active (semi-passive) systems, which are passively activated and in which a battery is used on demand (for instance for transmitting data), are available.

A smart card or chip card usually is a tiny secure crypto processor embedded within a credit card-sized card or within an even smaller card, like a GSM card. A smart card normally does not contain a battery, but power is supplied by a card reader/writer, that is to say by a read and/or write device for controlling the functionality of the smart card by reading data from the smart card or by writing data to the smart card. A smart card device is commonly used in the areas of finance, security access and transportation. Smart cards normally contain high security processors that function as a security storage of data like card holder data (for instance name, account numbers, a number of collected loyalty points). Access to these data is only possible when the card is inserted in or coupled to a read/write terminal.

According to another exemplary embodiment of the invention, the calibration and data transmission scheme as described hereinbefore is also used for suppressing distortions (like ripples) in a voltage generated by a voltage supply unit. By taking this measure, voltage drops or other distortions may be avoided. Particularly, a voltage smoothing effect is obtained. The system may be used in amplifiers in order to regulate a signal when signal distortions are measured. In a low-pass filter, a voltage may be smoothed by performing a frequency-dependent suppression of interference signals.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter by way of examples, to which the invention, however, is not limited.

DESCRIPTION OF EMBODIMENTS

Figure 1:
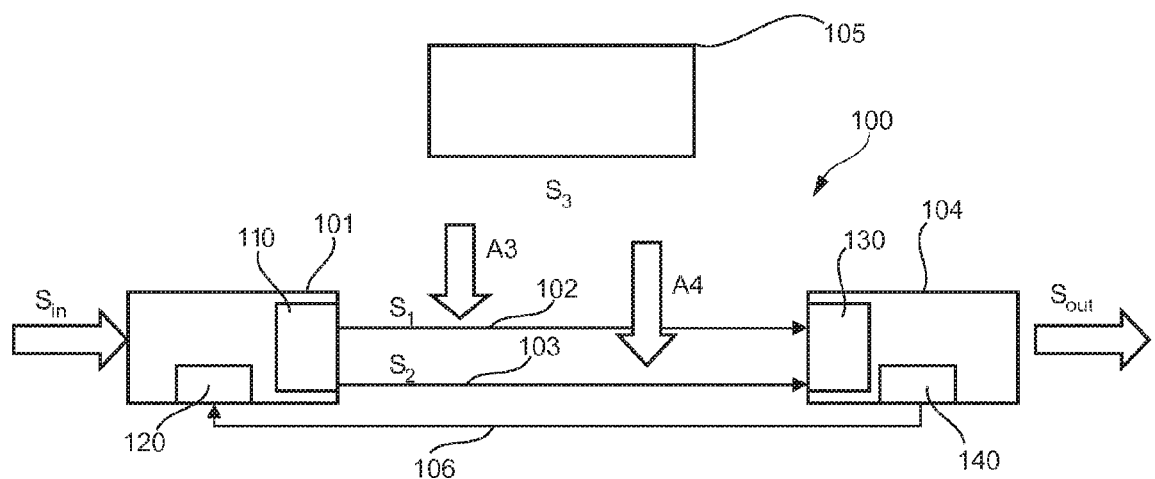
FIG. 1 and FIG. 2 show signal transmission systems according to exemplary embodiments of the invention.

The illustration in the drawing is schematically. In different drawings, similar or identical elements are provided with the same reference signs.

FIG. 1 shows a signal transmission system 100 according to an embodiment of the invention.

The signal transmission system 100 comprises a transmitter device 101 for transmitting a first signal $s_1$ via a first data transmission channel 102 and for transmitting a second signal $s_2$ via a second data transmission channel 103 to a receiver device 104. The signals $s_1$ and $s_2$ may be differential signals.

An input signal $s_{in}$ is supplied to an input of the transmitter 101. This input signal $s_{in}$ is processed within the transmitter 101 to generate the pair of differential signals $s_1$ and $s_2$ having opposite phase.

In this example, a source of interference 105 acts on the signals $s_1$ and $s_2$ during transmission over data transmission lines 102 and 103. The interference signal is denoted with $s_3$. According to this embodiment, the influence of the interference signal $s_3$ on the first signal $s_1$ is described by a transfer function A3, which differs from a transfer function A4 indicative of an influence of the interference signal $s_3$ on the second signal $s_2$.

Usually, A3 is considered to be identical to A4. However, in many cases, this is just a rough approximation yielding an improper data transmission quality due to the different impact of the interference signal $s_3$ on the signals $s_1$ and $s_2$.

After having been received by the receiver 104, the received signals are processed again, particularly in accordance with a transfer function of the receiver 104, and an output signal $s_{out}$ is output by the receiver 104.

In accordance with this embodiment of the invention, the influence of the interference signal $s_3$ on the signals $s_1$ (described by A3) and $s_2$ (described by A4) is suppressed by a corresponding method which will be explained hereinafter in more detail.

According to the inventive method, the system 100 is operated in a manner that the transmitter 101 is first brought to a silent or mute state. In such a mute state, essentially no signal is emitted from the transmitter 101 over the communication channels 102 and 103.

In this operation state, the receiver transfer function of the receiver 104 is adjusted in such a manner that the output signal $s_{out}$ of the receiver 104 is made acceptable small or is even minimized. Corresponding optimization algorithms are known by the skilled person. For example, gain and/or phase parameters are incremented or decremented, and the response of the system is monitored. If this change improves the quality and reduces the output signal $s_{out}$, it is accepted, otherwise it is rejected. By such an iterative procedure, an optimum transfer function can be obtained. Namely, when no useful signal is transmitted from the transmitter 101 to the receiver 104, $s_{out}$ should be "0" in an ideal case.

In order to minimize an impact of the interference signal $s_3$, the transfer function of the receiver 104 is adjusted. Via a feedback line 106, the adjusted receiver transfer function parameters are transmitted to the transmitter 101. Based on these data, a transmitter transfer function of the transmitter 101 is adjusted to be inverse to the adjusted receiver transfer function of the receiver 104. Subsequently, data communication is started. By adjusting the transfer functions of the transmitter 101 and of the receiver 104, the signal transmission quality is improved or optimized, since the influence of the source of interference 105 is suppressed.

For this reason, the transmitter 101 comprises a muting unit 110 adapted for muting the transmitter 101, that is to say to bring the transmitter 101 in an operation state in which it is silent and does not emit a signal. A setting unit 120 of the transmitter 101 is adapted for setting a transmitter transfer function of the transmitter 101 to be inverse to a receiver transfer function of the receiver 104 which has been adjusted before so that the output signal $s_{out}$ of the receiver 104 is minimized.

Furthermore, for this reason, the receiver 104 comprises an adjustment unit 130 for adjusting a receiver transfer function of the receiver 104 in a mute state of the transmitter 101 so that an output signal $s_{out}$ of the receiver 104 is minimized. A transfer unit 140 is provided for transferring the adjusted receiver transfer function to the transmitter 101 via the feedback loop 106 to enable the transmitter 101 to set the transmitter transfer function of the transmitter 101 to an inverse to the adjusted receiver transfer function.

Figure 2:
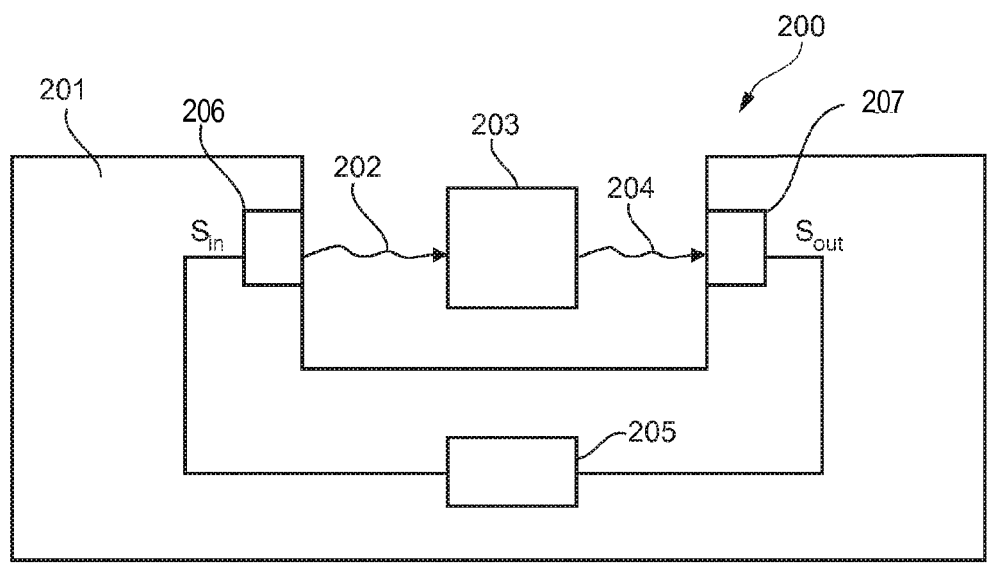

FIG. 1 shows a transmitter 101 which is accommodated in a different device than the receiver 104. By contrast, FIG. 2 shows an RFID system 200 (which is one particular example for a wireless transmission system), wherein a transmitter 206 and the receiver 207 are accommodated in one and the same device, namely in an RFID reader 201.

The transmitter 206 emits a signal 202 (e.g. via a transmission coil) which subsequently is modulated by an RFID tag 203 so that a receiver 207 (e.g. via a receiving coil) can detect a modulated signal 204.

A control unit (for instance a central processing unit, CPU) 205 is provided to control the signal transmission via the transmitter 206 and the signal reception via the receiver 207. Furthermore, signals are processed by the CPU 205. Moreover, a transfer function to suppress interfering signals, which function has been adjusted in the receiver 207, is conveyed from the receiver 207 via the control unit 205 to the transmitter 206 so that the transfer function in the transmitter 206 the inverse of the one of the receiver 207.

In the following, a scheme of adjusting transfer functions according to an exemplary embodiment of the invention will be explained by reference to FIG. 1. In detail, the described scheme performs a re-adjustment of the symmetry of a symmetric system to suppress common mode interferences.

In conventional systems, the symmetry is implemented the following way. The transmitter 206 amplifies the input signal $s_{in}$, creates the two signals $s_1$ and $s_2$ with the opposite phase, and transmits them over the two transmission channels 102, 103. At the receiver 104, the signals are subtracted and the result $s_{out}$ should be identical with the input signal $s_{in}$.

The source of interference 105 couples the interference signal $s_3$ in both transmission channels 102, 103. If the signals $A_3\, s_3$ and $A_4\, s_3$ are equal in magnitude and phase, they are canceled out by the subtraction in the receiver 104. These coherences may be written with the aid of Laplace transfer functions.

Transfer function of the transmitter 101: $A_{T(s)}$
Transfer function of the receiver 104: $A_{R(s)}$
Transfer function of coupling the interference signal $s_3$ into the first transmission channel 102: A3
Transfer function of coupling the interference signal $s_3$ into the second transmission channel 103: A4

The signals coupled into the two transmission channels 102, 103 are as follows:

$$s_{1(s)} = \tfrac{1}{2} s_{in(s)} A_{T(s)}$$

$$s_{2(s)} = \tfrac{1}{2} s_{in(s)} A_{T(s)} (-1)$$

The resulting signal is:

$$s_{out(s)} = (s_{1(s)} + A3 s_{3(s)}) A_{R(s)} - (s_{2(s)} + A4 s_{3(s)}) A_{R(s)}$$

In conventional systems, the coupling transfer functions of the interference signal, A3 and A4, are considered to be equal. Under these circumstances, the common mode interference is erased by the subtraction in the receiver 104.

$$s_{out(s)} = s_{in(s)} A_{T(s)} A_{R(s)}$$

In reality, the interference transfer functions A3 and A4 are unequal why the common mode interference is not canceled out by the subtraction in the receiver 104.

To reduce or minimize the interference according to an embodiment of the invention, the following approach can be used.

The receiver 104 uses two input stages $A_{R1(s)}$ and $A_{R2(s)}$, and the transmitter 101 uses two output stages $A_{T1(s)}$ and $A_{T2(s)}$.

In a first step, the transmitter 206 is turned silent. Hence, only the interference signals are received. Now the two input stages $A_{R1(s)}$ and $A_{R2(s)}$, are adjusted in gain and phase so that the output signal is a minimum.

$$s_{out(s)} = A_{R1(s)} A3 s_{3(s)} - A_{R2(s)} A4 s_{3(s)} = 0 \rightarrow A_{R1(s)} A3 = A_{R2(s)} A4$$

To compensate the different transfer functions of the receiver 104, the transmitter transfer functions are made the inverse transfer functions of the receiver 104 in a second step, $$A_{T1(s)} = (A_{R1(s)})^{-1}$$

$$A_{T2(s)} = (A_{R2(s)})^{-1}$$

In a third step, the transmission of the signals can start. The common mode interference is suppressed by the different transmitter and receiver transfer functions.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The use of the verb "comprise" and "its conjugations do exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A method of operating a system for transmitting differential signals from a transmitter to a receiver that produces an output signal by comparing the differential signals, the method comprising:
    muting the transmitter by placing the transmitter in an operation state in which the transmitter is silent;
    determining a receiver transfer function by adjusting a gain value and/or a phase value of an input stage of the receiver so that the measured output signal is a minimum;
    setting a transmitter transfer function of the transmitter to be inverse to the determined receiver transfer function to suppress common mode interference.

2. The method according to claim 1, comprising the step of transmitting the differential signals via a multi-channel communication path from the transmitter to the receiver.

3. The method according to claim 1, comprising the step of adjusting the receiver transfer function by adjusting a plurality of stages of the receiver.

4. The method according to claim 1, comprising adjusting the receiver transfer function in a frequency dependent manner to allow a frequency dependent subtraction of signals.

5. A non-transitory computer-readable medium, in which a computer program of operating a system for transmitting signals from a transmitter to a receiver is stored, which computer program, when being executed by a processor, is adapted to carry out or control a method according to claim 1.

6. A method of operating a system for transmitting signals from a transmitter to a receiver, the method comprising the steps of:
    muting the transmitter;
    adjusting a receiver transfer function of the receiver so that an output signal of the receiver is minimized by adjusting a plurality of stages of the receiver; and
    setting a transmitter transfer function of the transmitter to be inverse to the adjusted receiver transfer function by adjusting the plurality of stages of the transmitter to be inverse to a respective one of the plurality of stages of the receiver.

7. A transmitter for a system for transmitting signals from the transmitter to a receiver, the transmitter comprising
a muting unit adapted for muting the transmitter by placing the transmitter in an operation state in which the transmitter is silent; and
a setting unit adapted for setting a transmitter transfer function of the transmitter to be inverse to a receiver transfer function of the receiver that is determined by adjusting a gain value and/or a phase value of an input stage of the receiver so that a measured output signal of the receiver is minimized.

8. A receiver for a system for transmitting signals from a transmitter to the receiver that produces an output signal representing the transmitted signals from the transmitter, the receiver comprising
an adjustment unit for determining a receiver transfer function by adjusting the receiver, in response to a mute state of the transmitter, so that the measured output signal of the receiver is minimized; and
a transfer unit for transferring the determined receiver transfer function to the transmitter to enable the transmitter to set a transmitter transfer function of the transmitter to be inverse to the determined receiver transfer function.

9. A signal transmission system, comprising a transmitter according to claim 7 for transmitting signals to a receiver for transmitting signals from a transmitter to the receiver that produces an output signal representing the transmitted signals from the transmitter, the receiver comprising
an adjustment unit for determining a receiver transfer function by adjusting the receiver, in response to a mute state of the transmitter, so that the measured output signal of the receiver is minimized; and
a transfer unit for transferring the determined receiver transfer function to the transmitter to enable the transmitter to set a transmitter transfer function of the transmitter to be inverse to the determined receiver transfer function.

10. The signal transmission system of claim 9, comprising a signal transmission channel for transmitting the signals from the transmitter to the receiver and comprising a transfer function transfer channel for transferring the determined receiver transfer function from the receiver to the transmitter.

* * * * *